May 9, 1961 L. M. GLICKMAN ET AL 2,983,881
MAGNETIC PULSE WIDTH MODULATION SYSTEM
Filed Oct. 1, 1957
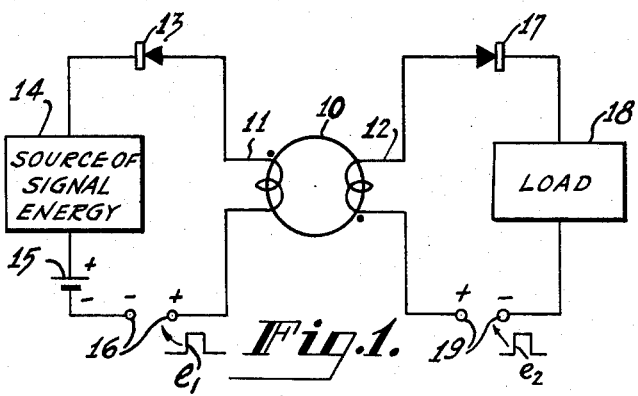
Fig.1.
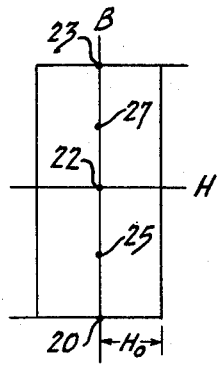
Fig.2.
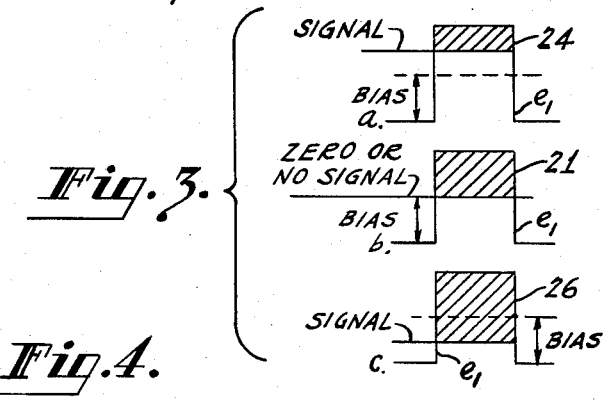
Fig.3.
Fig.4.
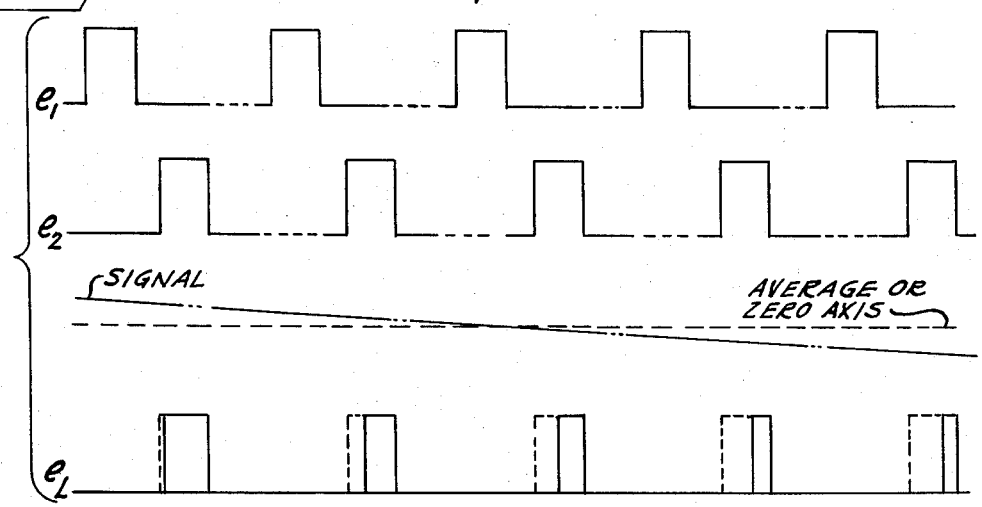
INVENTORS
LESTER M. GLICKMAN &
WLADYSLAW J. BIEGANSKI
BY Charles H. Brown
ATTORNE

United States Patent Office 2,983,881
Patented May 9, 1961

2,983,881

MAGNETIC PULSE WIDTH MODULATION SYSTEM

Lester M. Glickman and Wladyslaw J. Bieganski, Camden, N.J., assignors, by mesne assignments, to the United States of America as represented by the Secretary of the Army Filed Oct. 1, 1957, Ser. No. 687,634

1 Claim. (Cl. 332—12)

The invention relates to pulse modulation systems. Particularly, the invention relates to a modulation system including a magnetic element for producing an output pulse having a width determined by the amplitude of a signal applied to the input of the system.

A general object of the invention is to provide an improved pulse modulation system.

A further object is to provide a novel pulse width modulation system including a magnetic element.

Another object is to provide a novel magnetic pulse width modulation system which is reliable and simple in operation, and requires a minimum number of components.

Still another object is to provide a novel pulse width modulation system including a magnetic core device such that the system is compact in construction and is readily adaptable for use in a time division multiplex system.

According to one embodiment of the invention, a pulse modulation system is provided including a magnetic core device or element having mounted thereon a primary winding and a secondary winding. An input circuit including a source of signal energy and a first source of square or rectangular pulses of constant area (constant width and amplitude) is connected to the primary winding. An output circuit including a second source of square or rectangular pulses of constant area (constant width and amplitude) and a load is connected to the secondary winding. Assuming that the core is in one of its two possible states of saturation, the primary winding is wound on the core such that the application of a pulse to the primary winding from the first pulse source results in the core being driven in a given direction toward its other state of saturation. The actual state of magnetization (i.e. the point or position on the magnetization or hysteresis curve) in which the core is placed by this action is determined according to the amplitude of the signal energy applied from the signal source to the primary winding of the core at the time of the pulse.

A pulse is thereafter applied from the second pulse source to the secondary winding. The secondary winding is wound on the core such that the application of the pulse to the secondary winding results in the core being returned to its original state of saturation. The time required for the pulse to return the core to its original state of saturation will depend upon the state of magnetization (i.e. point or position on the magnetization or hysteresis curve) in which the core has previously been placed by the application of the pulse from the first pulse source to the primary winding. Since the state of magnetization is determined according to the amplitude of the signal energy, the pulse supplied by the second pulse source will appear at the load as an output pulse having a width determined by the amplitude of the signal energy. In other words, the energy content of the pulse supplied by the second pulse source and which is effective at the load will be reduced by the amount required to return the core to its original state. If the pulses supplied by the first and second pulse sources are of constant amplitude, as described, the modulation is linear. In practice, the first and second sources of pulses may emanate from the same source, the second pulses being delayed relative to the first by a predetermined amount.

A more detailed description of the invention will now be given in connection with the accompanying drawing in which:

Figure 1 is a circuit diagram of a pulse width modulation system embodying the invention;

Figure 2 is an idealized hysteresis loop for the material of the core shown in the circuit of Figure 1; and Figures 3 and 4 are waveforms used in describing the operation of the circuit of Figure 1.

Referring to Figure 1, there is shown a magnetic core 10 having mounted thereon a primary winding 11 and a secondary winding 12. The core 10 is constructed of a material having a substantially square or rectangular $B$(flux density)—$H$(magnetic intensity) curve or hysteresis loop. An illustration of such a curve is given in Figure 2. The distinguishing feature of the material used in the core 10 is the abrupt increase (or decrease) in B when the magnetic intensity exceeds a threshold value $H_0$ (or $-H_0$). This phenomenon is used according to the invention to produce pulse width modulation.

The operation and construction of magnetic cores per se is known, and a detailed description thereof is unnecessary. Certain materials such as molybdenum Permalloy and zinc-manganese-magnesium ferrite exhibit a substantially rectangular or square hysteresis loop. A magnetic core is capable of being magnetized to saturation in either one of two directions. In one direction, a positive state arises and in the second direction a negative state arises.

A magnetic core in the positive state is said to contain a "one," and a magnetic core in the negative state is said to contain a "zero." When a magnetic core is shifted from a positive state to a negative state or from a negative state to a positive state, a voltage is induced in an output winding on the core, resulting, in general, in a current flow through the output winding of a polarity determined by the direction in which the output winding is wound on the core.

In the embodiment of the invention shown in Figure 1, the winding 11 is connected in series with a unidirectional current conducting devce such as a diode rectifier 13, a source of signal energy 14, a fixed source of unidirectional bias potential represented by a battery 15 and a source of pulses having a sharp or approximately zero rise and fall times such as square or rectangular pulese $e_1$ of constant amplitude and width, represented by terminals 16. The battery 15 and the source 16 are connected in the polarity indicated. The winding 12 is connected in series with a unidirectional current conducting device such as a diode rectifier 17, an output circuit or load 18 and a source of pulses having a sharp or approximately zero rise and fall times such as square or rectangular pulses $e_2$ of constant amplitude and width, represented by terminals 19. The source 19 is connected in the polarity indicated. While two separate pulse sources 16, 19 are indicated, the pulses $e_1, e_2$ may in certain applications be supplied by a single pulse source in a manner to be described. Many examples of pulse wave generators suitable for use with the invention are known. For example, an astable or a triggered multivibrator may be provided to which conventional pulse shaping and regulating circuits may be connected, if desired.

While the core 10 may be normally maintained in either of the two possible states of saturation, it will be assumed that the core 10 contains a "zero" or, in other words, is set to the negative state of saturation. With this assumption, the core 10 is set at the lowest point 20 on the B axis of the hysteresis loop as shown in Figure 2.

The winding 11 is wound on the core 10 in a direction such that the application from source 16 of a positive going pulse $e_1$ to the winding 11 causes the core 10 to shift toward its other or positive state of saturation. The amplitude and width values of the pulse $e_1$ are chosen so that, in the absence of signal energy from source 14 and in the absence of the battery 15, the application of the pulse $e_1$ will result in sufficient voltage being induced in winding 11 to cause the core 10 to shift into its "one" or positive state of saturation. The actual values are determined according to the core material used, the number of turns in winding 11 and other circuit constants to be described. Various mathematical and experimental procedures for determining the values according to the requirements of a particular application are known. In practice, the values of pulse $e_1$ are usually determined so that they are slightly less than are required to complete the shifting of the core from one state of saturation to the other.

In describing the operation of the invention, it will first be assumed that no signal energy is available at source 14 and that a positive going pulse $e_1$ is supplied by the source 16. The rectifier 13 is poled in the proper direction to permit current flow over the path including winding 11 and battery 15 upon the occurrence of pulse $e_1$. The amplitude of the resultant pulse effectively applied to the winding 11 will be determined according to the sum of the pulse $e_1$ plus the bias supplied by battery 15. It should be observed that the battery 15 is arranged to oppose or buck the voltage supplied by source 16. Referring to curve $b$ of Figure 3, it will be assumed that the value of the bias supplied by the battery 15 is set so that the resultant shift pulse effectively applied to the winding 11 will correspond in amplitude to approximately one-half that of the pulse $e_1$ supplied by source 16. The resultant shift pulse 21 supplied to the winding 11 is represented in curve $b$ of Figure 3 by the shaded section of the pulse $e_1$. A voltage is induced in the winding 11 sufficient to cause the core 10 to be set to a state of magnetization approximately half way up the B axis of the hysteresis loop, as at point 22 shown on the curve of Figure 2. In other words, the bias supplied by the battery 15 is set so that, in the absence of signal energy supplied by source 14, the core 10 will be shifted to a reference level or state of magnetization 22 upon each pulse $e_1$ being supplied by the source 16. It is to be noted that the bias supplied by the battery 15 will always be less than the voltage amplitude of pulse $e_1$.

Referring to Figure 4, there is shown a train of pulses $e_1$ and a train of pulses $e_2$ as might be supplied by the sources 16 and 19. It is seen that the pulses $e_1$ and $e_2$ are in an out-of-phase relationship. That is to say, when a pulse $e_1$ is supplied by source 16, a negative going driving voltage is simultaneously supplied by the source 19. In the same manner, when a positive going pulse $e_2$ is supplied by source 19, a negative going driving voltage is supplied by source 16. As will be discussed, the actual frequency or time at which the respective pulses $e_1$ and $e_2$ occur may be fixed to meet the requirements of a particular application. However, in the present embodiment, the pulses $e_1$ and $e_2$ of the same polarity should not overlap and should occur in time in an alternate sequence, thus $e_1$ then $e_2$, then $e_1$, then $e_2$, and so on, as shown in Figure 4.

It has been described how the core 10 is set to a state of magnetization at the point 22 of the hysteresis loop by the application of a pulse $e_1$ to winding 11 in the absence of signal energy from source 14. As shown by the dots adjacent windings 11 and 12, the winding 12 is wound on the core 10 in a direction opposite to that in which the winding 11 is wound on the core 10. As a result, the shift in the state of magnetization of the core 10 to point 22 results in a positive going voltage being induced in the winding 12. The rectifier 17 is poled such that it would normally conduct. However, the negative going drive voltage supplied by the source 19 at this time is set so that it is of sufficient amplitude to back-bias the rectifier 17, preventing the flow of current by the conduction of rectifier 17 through the output circuit and therefore preventing the appearance of an output pulse at the load 18.

Following the above action, the core 10 will continue to store the information placed therein or, in other words, will remain in the state of magnetization represented by point 22. The winding 12 is wound in a direction such that the application of a positive going pulse $e_2$ thereto from source 19 will cause the core 10 to shift back towards its negative state of saturation or point 20. As in the case of the pulses $e_1$, the amplitude and width values of the pulses $e_2$ may be chosen to meet the requirements of a particular application. The actual values are determined according to the number of turns in winding 12, the core material used, and so on. In any case, the values should be chosen so that upon the application of a pulse $e_2$ to the winding 12 sufficient voltage is induced in the winding 12 to cause the core 10 to be shifted from the positive state of saturation to the negative state of saturation. In other words, the pulse $e_2$ should be sufficient to return the core 10 from the point 23 of the curve given in Figure 2 to the point 20. In practice, the values of pulses $e_2$ are usually chosen so as to be slightly larger than are required to perform this action.

When the next pulse $e_2$ following the pulse $e_1$ which placed the core 10 at point 22 is supplied by the source 19, the core 10 will return to the negative state of saturation. Since the core 10 was set at a point 22 mid-way between the limits thereof represented by points 20 and 23, half of the $e_2 dt$ integral of the pulse $e_2$ will be expended in saturating the core 10, the pulse $e_2$ being sufficient to shift the core 10 from the positive state of saturation, point 23, to the negative state of saturation, point 20. As the amplitude of the pulse $e_2$ is constant, an output pulse having a width corresponding to one-half of the width or the remaining portion of the pulse $e_2$ will appear across the load 18. At the time that the core 10 is shifted by the pulse $e_2$, a positive going voltage will be induced in the winding 11. The negative going control voltage supplied by the source 16 is, however, set so as to be of a sufficient level to back-bias the rectifier 13, preventing the rectifier 13 from conducting. Current will not flow in the input circuit.

The source 14 may be arranged to supply signal energy in the form of a sine wave, triangular wave, sawtooth wave or in any waveform so long as the waveform does not include frequency components greater than one-half of the repetition rate of the pulses $e_1$. Since the result or effective shift pulse actually applied to the winding 11 is the sum of the signal energy supplied by source 14, the bias supplied by battery 15 and the pulse $e_1$, the amplitude of the pulses $e_1$, the amount of bias supplied by battery 15 and the level of the signal supplied by source 14 should be set in a predetermined relation to one another. This predetermined relation is such that the average or the zero axis of the signal will occur at a level on the pulses $e_1$ which permits the extreme positive and negative going excursions or limits of the signal with respect to the average or zero axis of the signal to occur within the limits of the pulses $e_1$. It will be assumed that the source 14 is arranged to supply signal energy in the form of a sine wave and that the bias supplied by battery 15 has been set to cause the zero axis of the sine wave signal to occur, in effect, mid-way on the pulses $e_1$. In practice, however, the bias may be adjusted to cause the average or zero axis of the signal to occur at any level of the pulses $e_1$, depending upon the type of signal waveform supplied by source 14 and the requirements of the particular application.

It has been shown that when there is no signal energy at the time a pulse $e_1$ is applied to the winding 11, and the biasing level is set half way between the limits of the pulse $e_1$ as shown in curve $b$ of Figure 3, an output pulse having a width half that of pulses $e_2$ will be applied to the load 18. Since it has been assumed that the battery 15 is chosen to supply sufficient bias to cause the zero axis of the sine wave signal supplied by source 14 to occur, in effect, mid-way on the pulses $e_1$, it is clear that each time a pulse $e_1$ is applied to winding 11, at the time that the signal supplied by source 14 is passing through the zero axis thereof, an output pulse will be applied to load 18 upon the next occurrence of the pulse $e_2$. The pulse applied to the load 18 will have substantially the same amplitude as the pulse $e_2$ but will be one-half the width. When the signal is positive going at the time that a pulse $e_1$ is applied to the winding 11, the signal level additively combines with the bias supplied by battery 15 and functions to reduce the amplitude of the resultant pulse obtained from the application of the pulse $e_1$ by an amount corresponding to the sweep of the signal above the zero axis thereof. The resultant shift pulse effective on the winding 11 will have an amplitude correspondingly less than one-half the amplitude of the pulse $e_1$. This is true because the shift pulse will be one-half the amplitude of the pulse $e_1$ when zero signal energy is supplied by source 14. For example, the signal may occur half-way between the biasing level and the upper limit of the pulse $e_1$, as shown in curve $a$ of Figure 3. The shift pulse 24 indicated by the shaded portion of the pulse $e_1$ will be one-half the amplitude of pulse 21 shown in curve $b$ of Figure 3. When the resultant shift pulse 24 is applied to the winding 11, the voltage induced in the winding 11 is sufficient only to cause the core 10 to be driven to a state of magnetization represented by the point 25 positioned half-way between the points 20 and 22 on the B axis shown on the curve of Figure 2.

When the next pulse $e_2$ from the source 19, is applied to the winding 12, only one-quarter of the $e_2 dt$ integral of the pulse $e_2$ will be expended in returning the core 10 to the negative state of saturation represented by point 20. As a result, the pulse $e_2$ will appear across the load 18 as an output pulse having the same amplitude but three-quarters the width of the pulse $e_2$.

If the signal should be negative going at the time a pulse $e_1$ is applied to the winding 11, the signal level will, in effect, reduce the bias supplied by battery 15 a corresponding amount such that the resultant shift pulse effectively applied to the winding 11 will have an amplitude correspondingly greater than one-half the amplitude of the pulse $e_1$. For example, the signal may occur half-way between the biasing level and the lower limit of the pulse $e_1$, as shown in curve $c$ of Figure 3. The shift pulse 26 indicated by the shaded portion of the pulse $e_1$ will have an amplitude one and one-half times the amplitude of the pulse 21 shown in curve $b$ of Figure 3. When the shift pulse 26 is applied to the winding 11, a voltage will be induced in the winding 11 sufficient to drive the core 10 to a state of magnetization represented by a point 27 positioned on the B axis half way between the points 23 and 22 shown on the curve given in Figure 2.

When the next pulse $e_2$ is applied to the winding 12 from source 19, three quarters of the $e_2 dt$ integral of the pulse $e_2$ will be expended in returning the core 10 to the negative state of saturation represented by point 20. The output pulse applied to the load 18 will have the same amplitude but will have a width one-quarter the width of the pulse $e_2$.

A pulse modulation system is provided in which the output pulses appearing across the load 18 will be of a width determined according to the amplitude of the signal energy supplied by the source 14 at the time of the pulses $e_1$. The output pulses will have maximum width when the signal is at the maximum positive level and minimum width when the signal is at the maximum negative level. As the signal varies in amplitude, the width of the output pulses applied to the load 18 will vary in a corresponding manner. The pulse modulation system of the invention is compact and reliable in operation and requires a minimum number of components of relatively small size and weight. A feature of the invention is the use of the rectifiers 13, 17 and the means by which the rectifiers 13, 17 are back-biased to prevent the production of undesired current flow in the input and output circuits, respectively, during the operation of the core 10 in the manner described. By providing pulses $e_1$ and $e_2$ of constant amplitude, the modulation is linear.

Various modifications may be made to the invention without departing from the spirit thereof. For example, the source of bias represented by battery 15 may be removed, and the necessary regulating circuits may be provided at the source 16 to vary the values and direct current component of the pulses $e_1$ according to the bias level required in a particular application. The operation of the invention will remain the same as described. Further, the shape of the pulses $e_1$ and/or pulses $e_2$ may be varied in a predetermined manner in certain applications where non-linear modulation is desired.

The invention is readily adaptable for use in a wide range of applications where it is desired to sample a signal at regular or irregular time intervals. Since the core 10 will store the information placed therein upon the reception of a pulse $e_1$ until the information is read out by a pulse $e_2$, the pulses $e_1$ and $e_2$ may occur in any phase relationship in a sampling system so long as the pulses $e_1$ and $e_2$ do not overlap and a pulse $e_2$ follows each pulse $e_1$. The invention is further adaptable for use as a gating circuit. For example, the source 16 may be arranged to supply the pulses $e_1$ at a regular rate to sample the signal energy supplied by source 14 at regular time intervals. It may be desirable, however, to provide an output pulse at load 18 corresponding to only certain selected ones of the sampling intervals. When no output pulse is desired, the source 19 may be operated to supply a pulse $e_2$ to the winding 12 at the same time that a pulse $e_1$ is supplied to the input circuit. The voltage induced in the respective windings 11, 12 will effectively cancel, leaving the core 10 in the negative state of saturation pending the reception of the next pulse $e_1$. When an output pulse is desired, the source 19 would be operated to supply a pulse $e_2$ following the preceding pulse $e_1$ by a desired time interval, and so on.

In such applications, the sources 16 and 19 may be, in practice, a single pulse source arranged to normally supply a first and second train of pulses one hundred and eighty or more degrees out of phase. A triggered bistable multivibrator is commonly used to perform such a function, the terminals 16 being connected to one side of the multivibrator and the terminals 19 being connected to the other side thereof. However, two separate pulse sources may be used which are both triggered by a common trigger circuit or arranged in some other manner for coordinated operation.

The invention is particularly useful in a time division multiplex system. In a multiplex system, a number of the core circuits shown in Figure 1 each connected to a different source of audio signal energy and to the load 18 would be provided, each core circuit representing a different channel of the multiplex signal. The sources 16 and 19 of each of the core circuits would be connected to a common pulse gating circuit functioning to cause first one and then the next core circuit to apply a width modulated sampling pulse to the load 18 in the manner described. The load 18 may include a simple multiple-to-single transmission line arrangement or other known circuits for combining the width modulated pulses produced by the different core circuits in multiplex fashion and for forwarding the resulting multiplex signal to a common radio transmitter or other equipment. By way of example, the sources 14 may supply audio signals in the range of 200 to 3000 cycles, the pulses $e_1$ and $e_2$ being supplied by the pulse gating circuit to each core circuit or channel albeit at different times to the different core circuits one hundred and eighty degrees out of phase and at a repetition frequency of, for example, eight kc. (kilocycles), the resulting multiplex signal appearing at the load 18 having a frequency eight kc. times the number of channels included in the multiplex system. The possible operating frequency for each channel would be determined by the switching time of the rectifiers 13, 17 used, the number of turns on windings 11, 12, and so on.

Referring to Figure 4, there is shown a series of waveforms as might occur in the operation of a single core circuit or channel according to the invention included in a time division multiplex system. The train of pulses $e_1$ and the train of pulses $e_2$ supplied by the pulse gating circuit are of the same constant frequency but are approximately one hundred and eighty degrees out of phase with one another. A pulse $e_1$ followed by a pulse $e_2$ will be applied to each core circuit in turn, the dotted lines in the waveforms indicating the period in which the pulses $e_1$, $e_2$ will be supplied to the other core circuits or channels. Each time a pulse $e_2$ is supplied to the channel in question, an output pulse $e_L$ will be produced having a width determined by the amplitude of the audio signal at the time of the immediately preceding pulse $e_1$. For the sake of description, the width of the output pulses $e_L$ is in each case compared with the width of the pulses $e_2$ indicated by the wider pulse including the area within the dotted line. It may be readily seen that during the positive going excursions of the audio signal wave the width of the output pulses $e_L$ is greater than half the width of the pulses $e_2$. During the negative going excursions of the audio signal wave, the width of the output pulses is less than half the width of the pulses $e_2$, and so on. In each case, the trailing edge of the output pulses $e_L$ will occur simultaneously with the trailing edge of the corresponding pulse $e_2$, the leading edge of each of the output pulses $e_L$ varying in time with respect to the leading edge of the pulses $e_2$ according to the amplitude of the audio signal. The receiving equipment of the multiplex system will include the usual separate receiving channels corresponding in number to the number of core circuits or transmitting channels constructed according to the invention. Each receiving channel may include the usual low pass filter circuits responsive to the width modulated pulses received to produce an output audio signal representative of the audio signal supplied by the corresponding one of the sources 14.

The pulse modulation system of the invention has wide application and is inexpensive to construct and maintain. The requirement of a minimum number of components of small size and weight makes the invention particularly valuable in applications where the overall size and weight of the equipment in which the invention is used are important factors.

What is claimed is:

A magnetic pulse width modulation system comprising, in combination, a magnetic core device capable of being made to assume either one of two stable states of saturation, a first winding wound on said core, a second winding wound on said core in a direction opposite to that in which said first winding is wound on said core, a source of alternating current signal energy having a varying amplitude, a rectifier, a pair of input terminals to which is applied a train of pulses of constant amplitude and width with a flat top and approximately zero rise and fall times, said pulses having a repetition rate at least twice the frequency of said signal energy, a source of uninterrupted unidirectional bias voltage of a polarity opposite to that of said pulses and of a value equal to one-half of the amplitude of said pulses, means to connect said first winding, said rectifier, said signal energy source, said bias source and said input terminals in series, said rectifier being poled in the proper direction and said pulses being of a polarity to cause upon one of said pulses being applied to said input terminals said core to shift from one of said states toward said other state, said core being made to assume a level of magnetization within the limits defined by said two states determined by the sum of said signal energy, said bias voltage and said applied pulse, a second rectifier, a load device, a second pair of input terminals to which is applied a second train of pulses of constant amplitude and width with a flat top and approximately zero rise and fall times, the pulses of said second train each singularly occurring in time after a pulse of said first train and before the next succeeding pulse of said first train, means to connect said load device, said rectifier, said second winding and said second pair of input terminals in series, said second rectifier being poled in the proper direction and the pulses applied to said second pair of input terminals being of a polarity to cause upon one of the pulses being applied to said second pair of input terminals said core to return from said level of magnetization to said one state, whereby a train of output pulses appears at said load device modulated in width according to the varying amplitude of said signal energy.

References Cited in the file of this patent

UNITED STATES PATENTS

| | | |
|---|---|---|
| 2,757,297 | Evans et al. | July 31, 1956 |
| 2,770,737 | Ramey | Nov. 13, 1956 |
| 2,780,782 | Bright | Feb. 5, 1957 |
| 2,798,169 | Eckert | July 2, 1957 |